(12) United States Patent
Ewald

(10) Patent No.: US 11,192,301 B2
(45) Date of Patent: Dec. 7, 2021

(54) DOSING MECHANISMS FOR 3D PRINTERS

(71) Applicant: HEWLETT-PACKARD DEVELOPMENT COMPANY, L.P., Houston, TX (US)

(72) Inventor: Brent Ewald, Vancouver, WA (US)

(73) Assignee: Hewlett-Packard Development Company, L.P., Spring, TX (US)

( * ) Notice: Subject to any disclaimer, the term of this patent is extended or adjusted under 35 U.S.C. 154(b) by 699 days.

(21) Appl. No.: 16/075,614

(22) PCT Filed: Apr. 21, 2017

(86) PCT No.: PCT/US2017/028986
§ 371 (c)(1),
(2) Date: Aug. 4, 2018

(87) PCT Pub. No.: WO2018/194685
PCT Pub. Date: Oct. 25, 2018

(65) Prior Publication Data
US 2021/0206066 A1    Jul. 8, 2021

(51) Int. Cl.
*B29C 64/218* (2017.01)
*B29C 64/321* (2017.01)
(Continued)

(52) U.S. Cl.
CPC .......... *B29C 64/218* (2017.08); *B29C 64/321* (2017.08); *B29C 64/343* (2017.08);
(Continued)

(58) Field of Classification Search
CPC ... B29C 64/218; B29C 64/329; B29C 64/343; B29C 64/393; B29C 64/321
See application file for complete search history.

(56) References Cited

U.S. PATENT DOCUMENTS 5,902,537 A    5/1999  Almquist et al.
9,517,591 B2  12/2016  Yoo et al.
(Continued)

FOREIGN PATENT DOCUMENTS

CN    203092747 U    7/2013
CN    103640870 A    3/2014
(Continued)

OTHER PUBLICATIONS

Glasschroeder et al., "Powder-bed Based 3D-printing of Function Integrated Parts", Retrieved from Internet: https://sffsymposium.engr.utexas.edu/sites/default/files/2014-062-Glasschroeder.pdf, Aug. 29, 2014, 18 pages.

*Primary Examiner* — Mary Lynn F Theisen
(74) *Attorney, Agent, or Firm* — Fabian VanCott

(57) ABSTRACT

It is disclosed a 3D printing system and a build material spreading method for a 3D printer that comprises: moving a spreader in a first pass in a first direction over a pile of build material at a first separation distance from a dosing surface thereby sweeping a first amount of build material; modify the first separation distance by the distance adjustment unit to a second separation distance; and moving the spreader in a second pass in a second direction towards the build surface to sweep a second amount of build material in a direction towards the build surface.

20 Claims, 5 Drawing Sheets

(51) Int. Cl.
   *B29C 64/343*   (2017.01)
   *B29C 64/393*   (2017.01)
   *B33Y 10/00*   (2015.01)
   *B33Y 30/00*   (2015.01)
   *B33Y 50/02*   (2015.01)
   *B29C 64/357*   (2017.01)

(52) U.S. Cl.
   CPC .......... *B29C 64/357* (2017.08); *B29C 64/393* (2017.08); *B33Y 10/00* (2014.12); *B33Y 30/00* (2014.12); *B33Y 50/02* (2014.12)

(56) References Cited

U.S. PATENT DOCUMENTS

| | | | |
|---|---|---|---|
| 2011/0293770 A1* | 12/2011 | Ackelid | ................ B29C 64/205 425/174.4 |
| 2015/0367415 A1 | 12/2015 | Buller et al. | |
| 2016/0121399 A1 | 5/2016 | Buller et al. | |

FOREIGN PATENT DOCUMENTS

| EP | 1674243 A2 | 6/2006 |
|---|---|---|
| WO | WO-2010095987 | 8/2010 |
| WO | 2014138386 A1 | 9/2014 |
| WO | WO-2014138386 | 9/2014 |

\* cited by examiner

DOSING MECHANISMS FOR 3D PRINTERS

BACKGROUND

Additive manufacture systems, commonly known as three-dimensional (3D) printers, enable objects to be generated on a layer-by-layer basis. Powder-based 3D printing systems, for example, form successive layers of a build material in a printer and selectively solidify portions of the build material to form layers of the object or objects being generated.

3D printing systems may comprise mechanisms for accurately measuring the amount of powder to be used in each of the successive layers in order to guarantee that each layer has an appropriate amount of powder and that the conditions of the system, such as layer temperature, are suitable.

BRIEF DESCRIPTION OF THE DRAWINGS

Examples will now be described, by way of non-limiting example only, with reference to the accompanying drawings, in which.

DETAILED DESCRIPTION

Figure 1A:
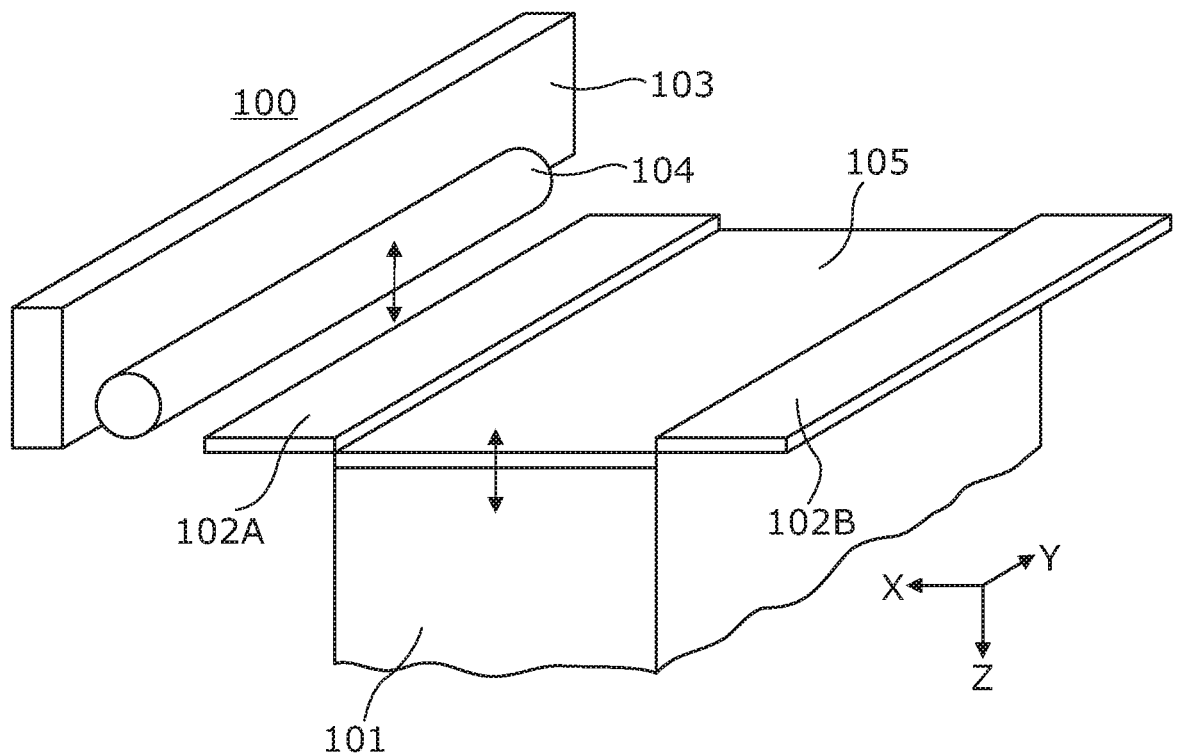
FIG. 1A shows an isometric view of a 3D printing system according to one example.
Figure 1B:
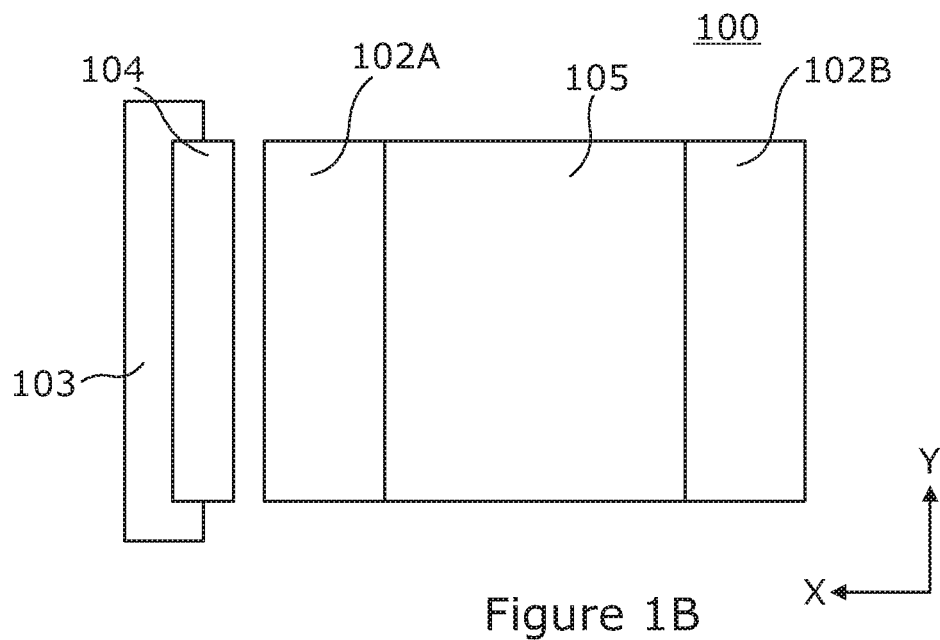
FIG. 1B is a plan view of the 3D printing system of FIG. 1A.

Referring now to FIGS. 1A and 1B a schematic view is shown of part of a 3D printing system.

In particular, FIG. 1A shows an isometric view of a system comprising a spreader 104, attached to a carriage 103, the spreader being movable within the carriage in at least a vertical direction (Z axis on the figures) so that it can be located at different separation distances or heights, with respect to, e.g., a dosing surface 102A or a build surface 105.

The 3D printing system of FIGS. 1A and 1B also comprises a build surface 105 wherein a determined amount of build material is to be spread to generate a layer of build material, either over the build surface 105 or over a previously processed layer of build material. The build material is spread by means of the spreader 104 which is shown in the figures as a roller but can be any device capable of conveying powdered material such as, e.g., a wiper.

In one example, the build surface 105 may be part of a build unit 106 that forms a build chamber, alternatively, the build unit may be removable from the other components of the 3D printing system. The 3D printing system 100 forms 3D objects within the build chamber as it selectively solidifies portions of each formed layer of build material. After each layer of build material is selectively solidified the build surface 105 is lowered, along the z-axis, to enable a new layer of build material to be formed thereon. Depending on the particular 3D printing system used, each layer of build material formed may have a height in the region of about 50 to 120 microns.

Furthermore, the system may comprise at least one auxiliary platform that can be used for support processes such as the dosing of the build material or the processing of excess build material. In particular, the system of FIGS. 1A and 1B comprises: a dosing surface 102A adjacent to the build surface 105 wherein material is treated for an accurate dosing; and a support surface 102B adjacent to the build material on the opposite side of the dosing surface 102A wherein, for example, excess material may be transferred for its reuse or disposal.

Figure 2A:
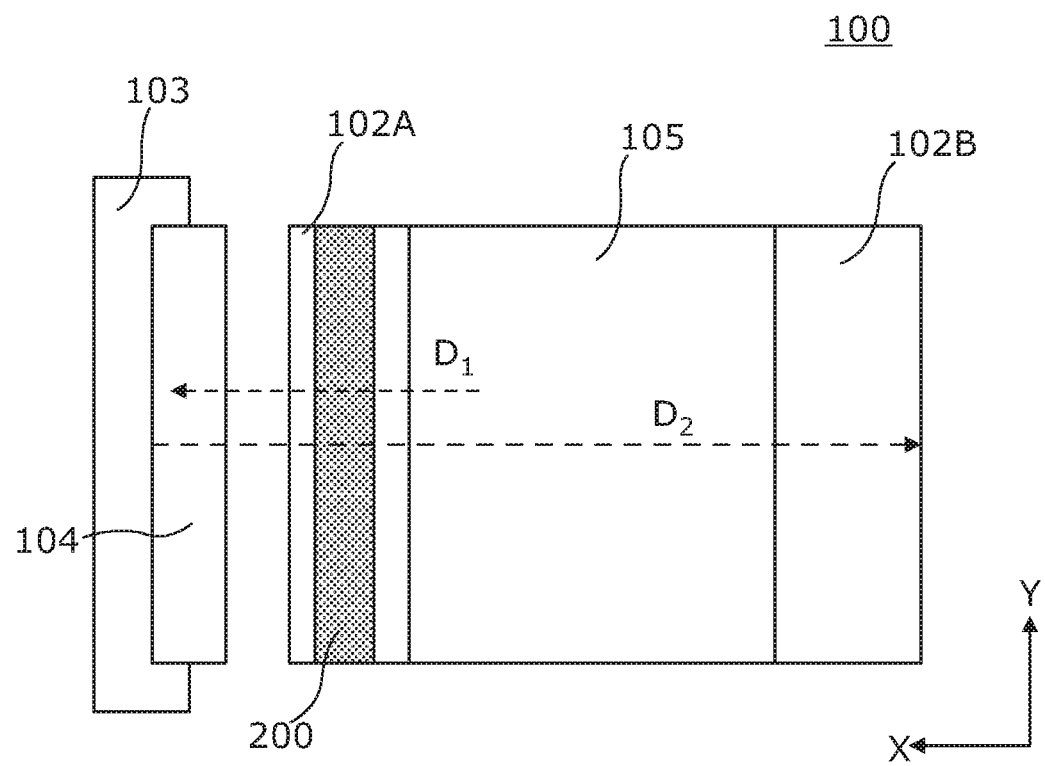
FIG. 2A shows an initial position of a spreading process according to one example.
Figure 2B:
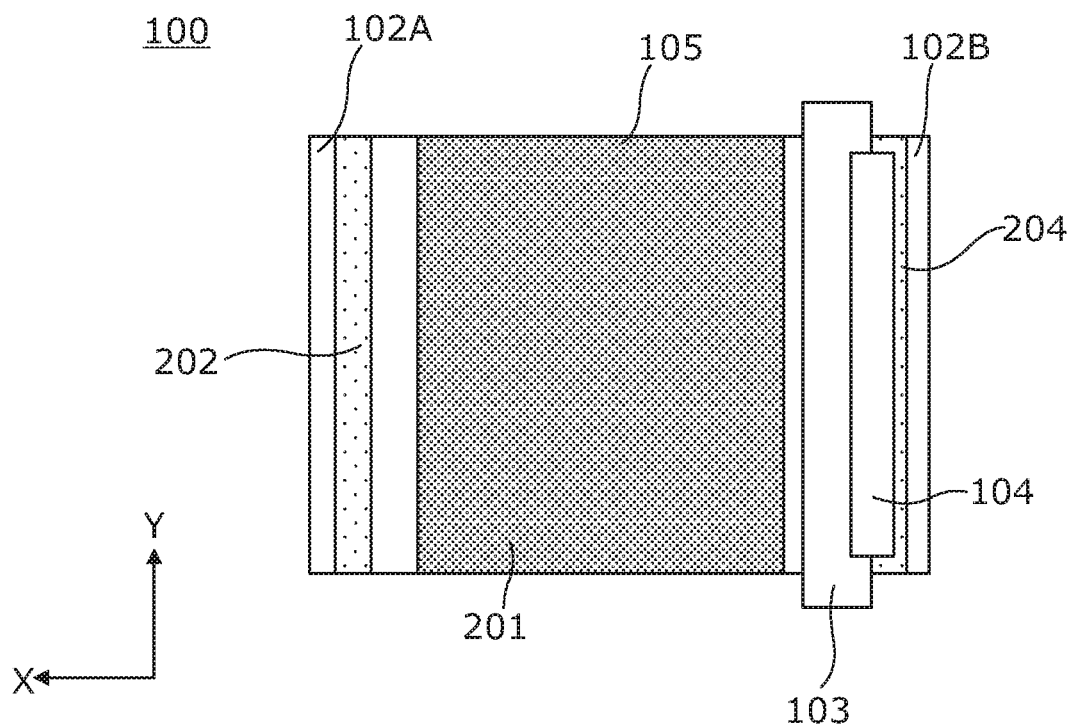
FIG. 2B shows the final position of the spreading process of FIG. 2A.

Referring now to FIGS. 2A and 2B an example spreading process is shown wherein, in a first stage, a pile of build material 200 is transferred from a storage unit to the dosing surface 102A by appropriate means such as a hopper, a feed tray, an auger or the like, Since build material may be powdered or particulate material, the measurement of the amount of build material that is actually transferred from a storage unit to the dosing surface 102A may be difficult to accurately quantify. This is further complicated by the fact that build material may be transferred rapidly so that its transfer does not affect the processing time of each layer of build material. Therefore, build material that is transferred from the storage unit to the dosing platform is generally about 10 to 30% over the theoretical amount of build material needed for each layer.

A pile of build material 200 is formed along the Y axis of the dosing surface, by means of a conveyor, such as, a hopper. As described further below, this pile of build material 200 comprises sufficient build material to provide an amount of excess build material 203, a base of build material 202 and a formed layer of build material 201 on the build platform.

Given that the pile of build material 200 comprises more material than needed to create a layer of build material on the build surface, a quantification may be performed before spreading the layer of build material. In an example, the carriage 103 performs a first sweep or pass in a first direction $D_1$ with the spreader 104 at a first height that removes excess build material 203 thereby leaving a flat top surface on the pile of build material 200. In an example, the build material left over the dosing surface 102A after the first pass may have the shape of a hexahedron and the current position of the spreader (the height at which the spreader made the first pass) may be used as a reference for determining the amount of build material to be spread over the build surface 105. The volume of build material to be spread can be calculated as a hexahedron with a length equal to the length of the spreader, a width previously defined by the hopper and a height which may be controllably defined by the separation distance between the spreader and the dosing surface.

In order to form an appropriate layer of build material on the build surface, the spreader 104 may be used to further define the portion of the pile of build material 200 that is to be used to form a layer of build material on the build surface. The spreader 104 and the dosing platform 102A are attached to different reference surfaces i.e., the dosing platform is attached to the build unit and the spreader 104 is attached to a different structural element, such as the carriage 103 which makes it difficult to design a system that placed them within, e.g., 100 μm of separation and in parallel before and after thermal expansion. Therefore it is complex to estimate the distance between the spreader and the dosing platform and, in consequence, the amount of dosed build material 200 that is transferred in each second pass.

To spread the build material, a second pass or sweep may be performed in a second direction D2 as to spread at least part of the build material left after the first pass over the dosing surface 102A over the build surface 105. In an example, This process may leave dosed build material 201 laid over the build surface, a base of build material 202 over the dosing surface 102A and/or residual build material 204 on the support surface 102B.

The layer of build material formed with the dosed build material 201 over the build surface 105 may then be selectively solidified by a printing mechanism and a new pile of build material may be transferred to the dosing surface 102A wherein the quantification and spreading process is repeated.

Excess build material which was removed in the first pass of the spreader 104 in the first direction D1 may be transferred to a storage wherein it may be processed and then reused, for example, by returning it to the build material storage. The transfer can be done, for example, by gravity (build material may be pushed from the dosing surface) or by vacuum. This transfer for reuse can also be applied to the base of build material 202 and the residual build material 204.

Figure 3:
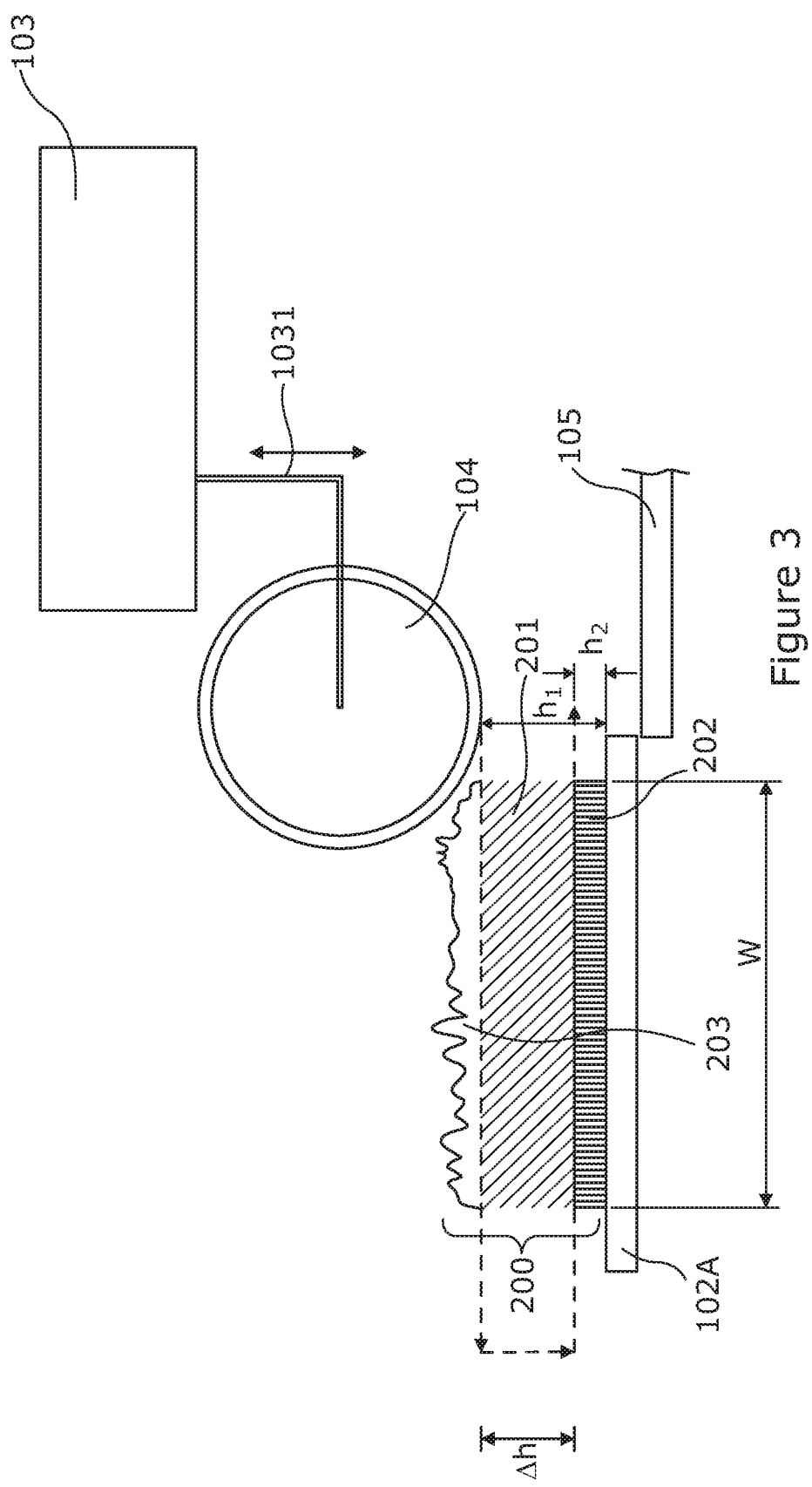
FIG. 3 is an schematic side view illustrating the dosing process of an example.

FIG. 3 is a schematic side view to illustrate an example of spreader 104 and a spreading method that helps in spreading an accurate amount of build material over the build surface 102A.

FIG. 3 shows an example where the pile of build material 200 that is transferred to the dosing surface 102A does not have a regular shape. Furthermore, the distance between the base of the spreader 104 and the dosing surface 102A may not be accurately known due to, for example, difficulty in mounting the spreader 104 to a carriage in parallel to the dosing surface 102A with an accuracy of 100 μm before and after thermal expansion.

In order to sweep an accurate amount of build material towards the build surface 105 the spreader 104 may be used to establish a reference distance with respect to the pile of build material 200. Also, this action serves to give regularity to the shape the pile of build material 200 and allows the amount of build material to be transferred to the build surface to be determined, i.e., the dosed build material 201.

First, the spreader 104 performs a first sweep in a first direction $D_1$ at a first separation distance or a first height $h_1$ with respect to the dosing surface, on the first sweep an amount of build material is removed from the pile of build material 200, this removed amount of build material is to be treated as excess build material 202, for example, by sending it to a storage unit for its reuse. Subsequently, the spreader 104 is moved to a second separation distance, or, in other words, lowered to a second height $h_2$ which, for example, may comply with the formulae:

$$Q_L = \Delta h * W * L;$$

wherein $\Delta h$ is the distance that the spreader needs to be lowered, $Q_L$ is the target volume of build material to be transferred to the build surface 105 and W and L are respectively the width and the length of the pile of build material 200. The distance $\Delta h$ can be accurately measured and is independent of manufacturing and/or attachment inaccuracies. In particular, in FIG. 3, with respect to the dosing surface 102A $\Delta h = h_1 - h_2$. The length and the width can be configured, e.g., on the hopper or the like upon transfer to the dosing surface or can be defined, for example, by using auxiliary spreaders to define the shape of the build material to be spread.

In a first example, the auxiliary spreaders may be configured to move along the y-axis along the length of the build material support 102A in order to, for example, configure the length of the pile of build material 200 prior to the spreading on the build surface 102A so that build material is deposited only in part of the build surface 102A.

Then, the spreader 104 performs a second pass in a second direction $D_2$ at a second height $h_2$. This second pass is performed in the direction towards the build surface 105 in order to spread the dosed build material 201 over the build surface leaving a base of build material 202 over the dosing platform.

The height $h_2$ is, for example, a height lower than $h_1$ but such as to leave a base of build material 202 over the dosing surface 102A which would eliminate the need for calibration between the positions of the spreader 104 and the dosing surface 102A. For example $h_1$ can be in the range of 1 to 1.5 mm and $h_2$ can be in the range of 0 to 0.5 mm.

Figure 4:
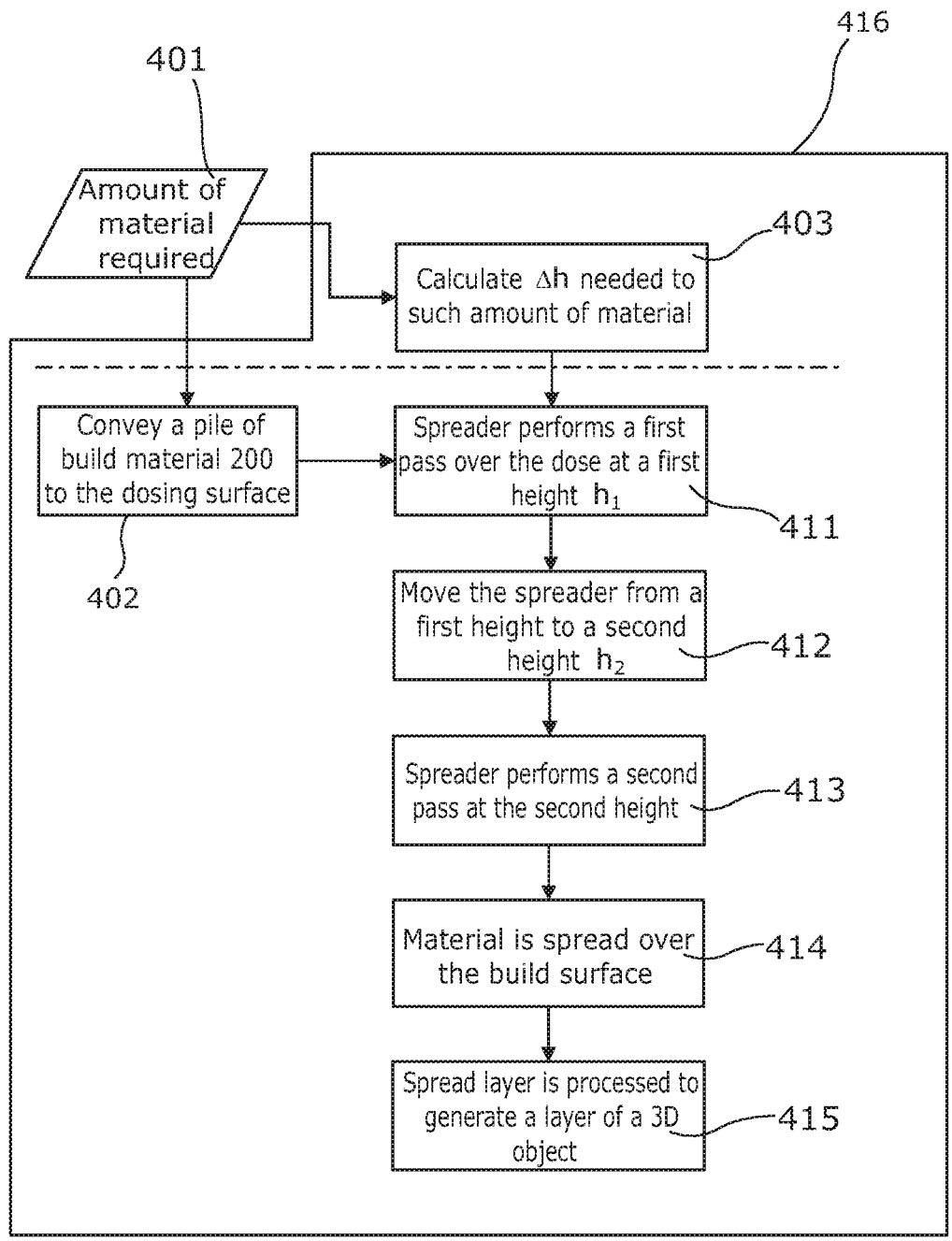
FIG. 4 shows a flow diagram illustrating the spreading process according to an example.

FIG. 4 shows a flow diagram to explain an example method for accurate dosing of build material to be formed on the build surface.

First, an amount of build material to be deposited for a layer is determined 401 by a user or is predetermined on the system. This amount of build material is communicated to a controller 416 which controls a conveyor in order to convey a pile of build material 200 to the dosing surface 402. As explained above, the amount that is conveyed towards the dosing surface may be, for example, 10-30% over the theoretical amount needed to form a complete layer. Furthermore, such information may be used to determine the height difference $\Delta h$ needed to perform an accurate dosing 403 using the spreader 104.

Then, an accurate dosing 411 is to be performed, therefore, the controller 416 commands the spreader 104 to perform a first pass over the pile of build material 200 at a first height $h_1$. This first pass has two main functions: to eliminate excess build material 203 and to generate a substantially uniform shape on the build material to be transferred towards the build surface. This may allow for an easier determination of the amount of build material to be transferred and to provide a reference height that will be used in the latter stages for an accurate measurement.

After providing a reference height directly associated to the build material, the controller 416 may be used to move the spreader vertically downwards by a distance of $\Delta h$ to second height $h_2$ 412 thereby decreasing the separation distance between the spreader and the dosing surface. The second height $h_2$ may have been previously defined in the accurate dosing 403. In an example, this second height $h_2$ is lower than the first height (closer to the dosing surface) but configured as to leave a base of build material 202. Leaving the base of build material 202 ensures that an accurate amount of material is swept towards the build surface 105 in comparison with a configuration wherein the second height $h_2$ is zero wherein some of the material may be left behind, for example, due to friction between the build material and the dosing surface 102A. Also, this configuration may cause less wear on the spreader 104.

It should be noted that in the example of FIGS. 1-3 the dosing surface 102A and the spreader 104 are attached to different datum surfaces and, as such, require complex calibration proceedings to be able to measure an amount of build material to be transferred to the build surface. However, the vertical movement of the spreader 104 can be known more accurately and can serve as the basis for the determination of the volume of build material to be spread, e.g., by using an encoder in the motor moving the spreader 104 or in the spreader 104 itself. In this case, instead of using the dosing surface 102A as a reference for the measurement, a first height $h_1$ can be used for such referencing.

After the spreader has been positioned at the second height $h_2$, the controller controls the moving of the spreader 104 to perform a second sweep 413 at the second height such as to transfer the dosed build material 201 towards the build surface 105 thereby generating a layer of build material. Since the second height $h_2$ is normally a small distance over the build surface, the second sweep may only transfer an upper part of the hexahedron of build material leaving the lower part, i.e., a base of build material over the dosing platform. This base of build material may be treated in the same manner as excess build material 203 or residual build material 204, i.e., transferring to an material recovery device for its processing and reuse or transferred back to the storage so that it is reused in a new pile of build material 200.

Subsequently, material is formed 414 over the build surface or over a previously printed layer of build material and, finally, build material is selectively solidified to generate a processed layer of build material.

Then a new transfer of a pile of build material 200 to the dosing is performed to process the next layer of build material until a 3D piece is finalized.

Figure 5:
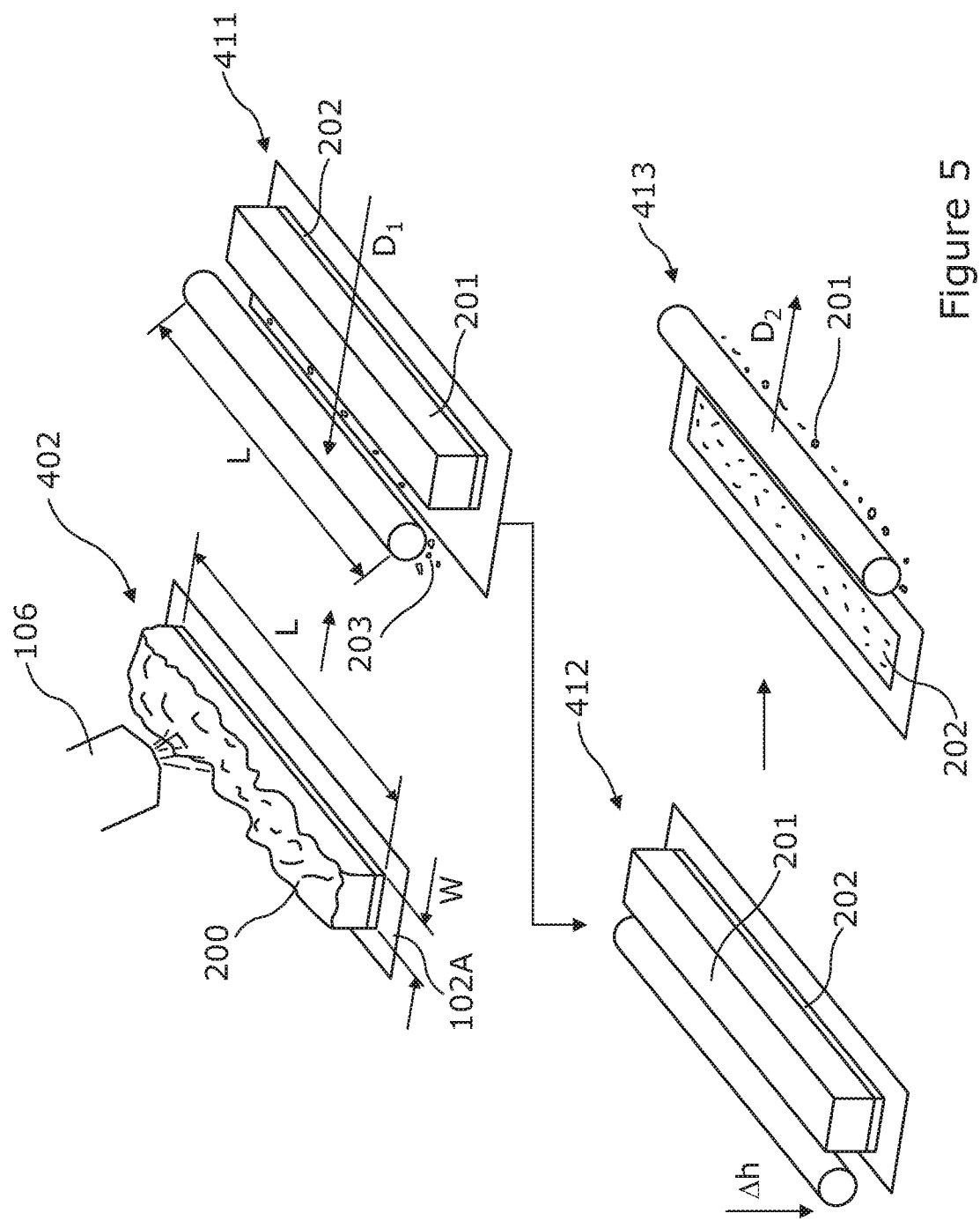
FIG. 5 shows a sequence for dosing the build material according to one example.

FIG. 5 shows schematically the method previously described with reference to FIG. 4.

FIG. 5 illustrates the conveying of build material 402 to the dosing surface wherein a pile of build material 200 is generated. The pile of build material has a determined width W and length L that may be pre-defined on a conveyor 106. Alternatively, the length and the width may be defined by controller 416 by the movement of the spreader 104 being the length L defined by the length of the spreader and the width W defined by the sweeping action. Also, as explained above the width W and the length L may be configured by the controller 416 using auxiliary spreaders.

Additionally, FIG. 5 shows the first sweeping action 411 wherein the controller 416 moves the spreader 104 to perform a first sweeping action at a first height h1. It is shown that the pile of build material 200 has been swept so that some excess material 203 is taken from its top surface and is transferred, e.g., to an intermediate storage unit for its reuse. Then, a hexahedron is formed and it is simpler for the controller to calculate the volume within such hexahedron. In an example, the calculations are based on a hexahedron with a substantially regular shape, however, the use of different algorithms, e.g., considering irregularities on the shape of the hexahedrons may also be envisaged.

In this example, the controller controls the spreader as to perform the first sweep in a direction away from the build surface 102A so that excess material is sent in a direction, e.g., material recovery device or towards the storage unit.

Subsequently, the controller 416, by means of a distance adjustment unit, lowers the spreader 104 by a height difference Δh to a second height 412. Such height difference Δh may have been previously calculated by the controller 416 in view of the hexahedron volume. In particular, Δh is the height of the upper part of the hexahedron that, when removed, leave the volume corresponding to the volume of build material needed to generate a layer with a determined thickness or volume over the build surface.

Finally, the controller 416 controls the spreader as to move it in the direction towards the build surface 102A in order to move a dosed amount of build material 201 towards the build surface 102A and leaving a base of build material 202 in the dosing surface.

Even though in the examples mentioned above, the spreader is to perform passes at different heights, it is also envisaged that the dosing surface may be moved along the Z axis as to modify the separation distance between the spreader and the dosing surface. Therefore, the first height can be likewise be interpreted as a first separation distance between the spreader and the dosing surface and the second height can likewise be interpreted as a second separation distance between the spreader and the dosing surface being such separation distance controlled by the controller and/or the distance adjustment unit.

In essence, it is disclosed a build material spreading method for a 3D printer that comprises conveying build material from a storage unit to a dosing surface by a conveyor thereby generating a pile of build material over the dosing surface; moving a spreader in a first pass in a first direction over the pile of build material at a first separation distance from the dosing surface thereby sweeping a first amount of build material from the pile of build material; modifying the first separation distance by the distance adjustment unit to a second separation distance; and moving the spreader in a second pass in a second direction towards a build surface adjacent to the dosing surface to sweep a second amount of build material in a direction towards the build surface.

Furthermore, in the first sweep, build material may be swept in a different direction as the direction of the second pass, for example, the direction of the first sweep is a direction different to the second sweep or, in another example, opposite to the direction of the second sweep.

In an example, moving the spreader in a second pass involves leaving a base of build material over the dosing surface after the second sweep. This helps to accomplish causing less wear on the spreader and/or the dosing surface. This is achieved in cases wherein the separation distance as modified by the distance adjustment unit is more than 0.

Additionally, in the first pass, this method may comprise sweeping a first amount of build material towards a material recovery device or towards the storage. This material recovery device may, in an example, process the build material and then return it to the storage unit.

In another example, the method comprises modifying by the distance adjustment unit the first separation distance between the spreader and the dosing surface, for example, by moving the spreader in a direction perpendicular to the dosing surface. However, the distance adjustment unit may also comprise moving the dosing surface in a direction normal or perpendicular to the dosing surface, i.e., upwards, or towards the spreader.

On the other hand, the 3D printer may comprise a controller for receiving an input with an amount of build material, calculating the second separation distance as to comply with the amount of build material received and, controlling the distance adjustment unit for moving the spreader or the dosing surface to the previously calculated second separation distance.

In an example, the second separation distance is calculated by the processing means or the controller considering that the second amount of build material is a hexahedron whose height is the second separation distance. Alternatively other geometries may be used for such calculation.

Further, it is disclosed a 3D printing system that comprises;
 a storage unit to receive build material;
 a conveyor to transport a pile of build material from the storage unit to a dosing surface;
 a build surface adjacent to the dosing surface;
 a spreader;
 a distance adjustment unit and
a controller to: control the movement of the spreader to move the spreader a first pass over the pile of build material at a first separation distance from the dosing surface to sweep a first amount of build material; control the distance adjustment unit to modify the first separation distance to a second separation distance; and move the spreader in a second pass to sweep a second amount of build material in a direction towards the build surface.

In one example, in the first pass, the spreader transforms the pile of build material into a hexahedron.

Furthermore, the controller may be to control the distance adjustment unit for sweeping in the second pass the upper part of the hexahedron with a height equal to the second separation distance is swept towards the build surface. Such predefining of the volume may be a setting on the 3D printing system or an input selectable by a user, e.g., a volume input.

In another example, after the second sweep, the upper part of the hexahedron with a height equal to the second separation distance is swept towards the build surface.

In a further example, in the first pass the controller controls the spreader to sweep build material towards a material recovery device or towards the storage unit.

The invention claimed is:

1. Build material spreading method for a 3D printer that comprises:
   conveying build material from a storage unit to a dosing surface by a conveyor thereby generating a pile of build material over the dosing surface;
   moving a spreader in a first pass in a first direction over the pile of build material at a first separation distance from the dosing surface thereby sweeping a first amount of build material from off the top of the pile of build material, wherein removing the first amount of build material reduces the pile to an amount of build material to be spread as a next layer of build material over a build surface;
   modifying the first separation distance by a distance adjustment unit to a second separation distance; and
   moving the spreader in a second pass in a second direction towards the build surface adjacent to the dosing surface to sweep a second amount of build material in a direction towards the build surface.

2. Method, according to claim 1, wherein the direction of the first pass is a direction different to the direction of the second pass.

3. Method, according to claim 2, wherein the direction of the first pass is a direction opposite to the direction of the second pass.

4. Method, according to claim 1, wherein moving the spreader in a second pass comprises leaving a base of build material over the dosing surface after the second pass.

5. Method, according to claim 1, wherein the moving of the spreader in the first pass comprises sweeping a first amount of build material towards a material recovery device or towards the storage unit.

6. Method, according to claim 1, comprising a controller for receiving an input with an amount of build material, calculating the second separation distance as to comply with the amount of build material received and, controlling the distance adjustment unit for moving the spreader or the dosing surface to the previously calculated second separation distance.

7. Method, according to claim 6, wherein the second separation distance is calculated by the processing means considering that the second amount of build material is a hexahedron whose height is the second separation distance.

8. Method, according to claim 1, wherein modifying the first separation distance comprises moving the spreader with respect to the dosing surface.

9. Method, according to claim 1, wherein conveying build material to the dosing surface further comprises conveying more build material to the dosing surface than is to be used for a next layer of build material to be distributed over the build surface.

10. Method, according to claim 1, wherein sweeping the first amount of build material from the top of the pile of build material leaves the pile of build material with a hexahedron shape.

11. Method, according to claim 1, wherein the first separation distance is in a range of 1 to 1.5 mm and the second separation distance is in a range of 0 to 0.5 mm.

12. Build material spreading method for a 3D printer that comprises:
    conveying build material from a storage unit to a dosing surface by a conveyor thereby generating a pile of build material over the dosing surface;
    moving a spreader in a first pass in a first direction over the pile of build material at a first separation distance from the dosing surface thereby sweeping a first amount of build material from the pile of build material;
    modifying the first separation distance by a distance adjustment unit to a second separation distance; and
    moving the spreader in a second pass in a second direction towards a build surface adjacent to the dosing surface to sweep a second amount of build material in a direction towards the build surface;
    wherein the modifying of the first separation distance between the spreader and the dosing surface comprises moving the spreader in a direction perpendicular to the dosing surface.

13. 3D printing system that comprises:
    a storage unit to receive build material;
    a conveyor to transport a pile of build material from the storage unit to a dosing surface;
    a build surface adjacent to the dosing surface;
    a spreader;
    a distance adjustment unit and
    a controller to:
    control the movement of the spreader to move the spreader a first pass over the pile of build material at a first separation distance from the dosing surface to sweep a first amount of build material;
    control the distance adjustment unit to modify the first separation distance to a second separation distance; and
    move the spreader in a second pass to sweep a second amount of build material in a direction towards the build surface.

14. System, according to claim 13, wherein, in the first pass, the spreader transforms the pile of build material into a hexahedron.

15. System according to claim 14, wherein the controller is to calculate the second separation distance as the height of the hexahedron that complies with a predefined volume of the second amount of build material.

16. System, according to claim 15, wherein the predefined volume is a volume input selectable by a user.

17. System, according to claim 14, wherein the controller is to control the distance adjustment unit for sweeping in the second pass the upper part of the hexahedron with a height equal to the second separation distance is swept towards the build surface.

18. System, according to claim 13, wherein the spreader is a roller.

19. System, according to claim 13, wherein in the first pass the controller controls the spreader to sweep build material towards a material recovery device or towards the storage unit.

20. System, according to claim 13, wherein the conveyor is to deposit more build material to the dosing surface than is to be used for a next layer of build material to be distributed by the spreader over the build surface, the first pass of the spreader to remove an amount of build material from the dosing surface so that a remaining amount of build material on the dosing surface is the amount to be used for the next layer to be distributed by the spreader over the build surface.

* * * * *